United States Patent [19]

Steele

[11] Patent Number: 5,425,178
[45] Date of Patent: Jun. 20, 1995

[54] SOLAR COMPASS

[76] Inventor: Felix G. Steele, P.O. Box 1138, Lakeside, Ariz. 85929

[21] Appl. No.: 253,709

[22] Filed: Jun. 3, 1994

[51] Int. Cl.⁶ .............................................. G01C 17/34
[52] U.S. Cl. ........................................ 33/271; 33/268
[58] Field of Search .................. 33/268, 269, 270, 271, 33/377, 379

[56] References Cited

U.S. PATENT DOCUMENTS

| D. 302,124 | 7/1989 | Bevins . | |
|---|---|---|---|
| 2,531,932 | 11/1950 | Brown | 33/268 |
| 2,637,108 | 5/1953 | Viesturs | 33/270 |
| 4,028,813 | 6/1977 | Eldridge | 33/270 |
| 4,899,451 | 2/1990 | Dandurand | 33/269 |

FOREIGN PATENT DOCUMENTS 2559 of 1889 United Kingdom .

Primary Examiner—Diego F. F. Gutierrez
Assistant Examiner—G. Bradley Bennett
Attorney, Agent, or Firm—Ogram & Teplitz

[57] ABSTRACT

An accurate, easy to use solar compass which permits a user to locate true north or to locate azimuth lines. The user calculates the solar time and determines the declination of the sun from the emphrimis. The user adjusts the compass to compensate for the declination of the sun and the physical location of the user. The user thus determines true north accurately using a shadow cast by a stylet. An important aspect of this invention is that it is an accurate solar compass.

15 Claims, 5 Drawing Sheets

SOLAR COMPASS

BACKGROUND OF THE INVENTION

This invention generally relates to a concept of providing an apparatus and method for determining true north without the use of a magnetic compass as well as a method for laying of azimuth lines from true north.

Various compass devices are known. Most common compasses utilize the principles of magnetism to locate north. These compasses, however, are greatly affected by naturally occurring magnetic perturbances which can lead to great inaccuracies. To avoid this problem, solar compasses have been proposed.

One such solar compass is described in U.S. Pat. No. 4,899,451, entitled "Solar Compass and Time Indicator Device", issued to Dandurand on Feb. 13, 1990. Dandurand's device, while providing a way to locate true north, lacked any means to correct for the location of the user (in terms of latitude). Additionally, Dandurand's device lacks the means to correct for the declination of the sun, which can vary significantly depending on the time of the year. Failure to correct for the location of the user and the declination of the sun introduces significant errors in finding true north. Aside from the errors in the location of true north, Dandurand's device also lacks the capability to sight off azimuth lines from true north.

Other solar compass have addressed some, but not all of these concerns. U.S. Pat. No. 4,028,813, entitled "Sun Compass" and issued to Eldridge on Oct. 22, 1975, corrects for the declination of the sun and the location of the user, but is very complex in composition and difficult to use.

It is clear from the foregoing that there is a need for an accurate, economical, easy to use solar compass and that the current state of the art is unable to meet this need.

SUMMARY OF THE INVENTION

The invention is an accurate, easy to use solar compass which permits the user to find true north, compensating both for the declination of the sun and location of the user, and to lay of azimuth lines from true north.

The user of the compass, in its preferred embodiment, first determines the solar time. Solar time takes into account the actual position of the sun and is based on the actual location of the sun corrected both for the location of the user (in terms of longitude) and for the equation of time, which compensates for variations in the sun's movement. For example, when the sun crosses the meridan of the place of observation, the solar time is 12 noon. The equation of time can be found in a solar ephemeris, a common reference manual distributed by government agencies and survey equipment companies.

Once the solar time is known, the user adjusts the solar compass to compensate for the declination of the sun and the latitude of the place of observation. The declination varies during the year and can also be found in the solar ephermeris. This completes the calibration of the compass.

Once the compass is calibrated, a pointer is adjusted according to the calculated solar time. The pointer then lies in the plane of the sun. The body of the compass is rotated until the shadow cast by the stylet is centered between two lines on the pointer. At this point, the compass indicates true north.

Alternatively, the compass rose is rotated until the shadow cast by the stylet falls between the two lines on the pointer. The azimuth is then read off the compass at the azimuth mark.

An important attribute of this invention is that it permits the user to easily adjust for the actual location of the user and the actual declination of the sun.

This aspect of the invention is important since failure to adjust for these factors could introduce significant errors in locating true north. The declination of the sun varies widely depending on the time of year and failure to adjust for this can be a large problem.

The invention has uses for surveyors who need an easy to use, accurate solar compass that can find true north unaffected by the magnetic field of the earth. Outdoor enthusiasts would also find this invention useful in orientering and hiking. Additionally the solar compass is utilized to teach students about time, the sun, and their relation.

The invention, together with various embodiments thereof, will be more fully illustrated by the accompanying drawings and the following descriptions.

DRAWINGS IN BRIEF

Figure 7:
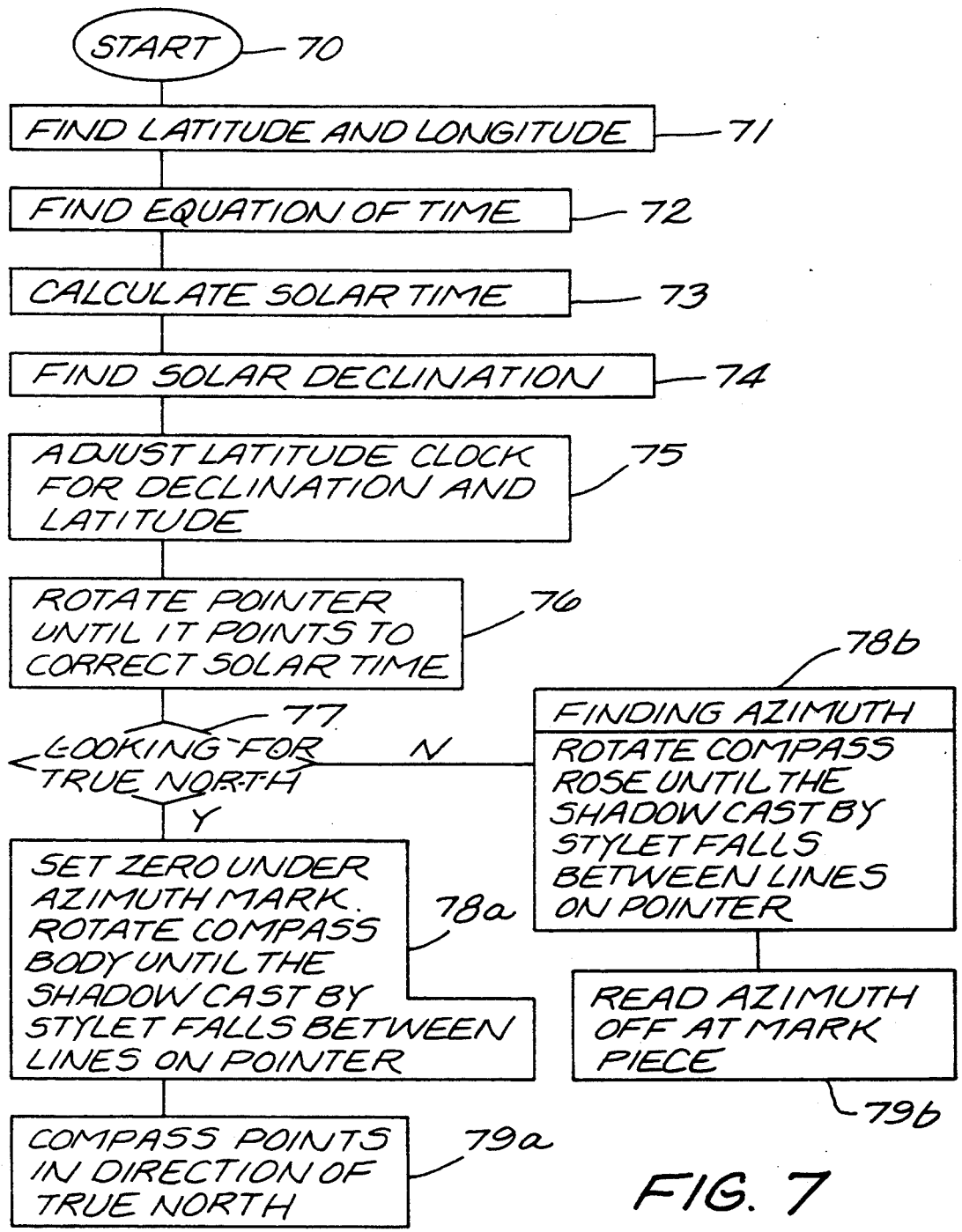

FIG. 7 diagrams the steps required to calibrate the compass and determine true north or an azimuth.

DRAWINGS IN DETAIL

Figure 1:
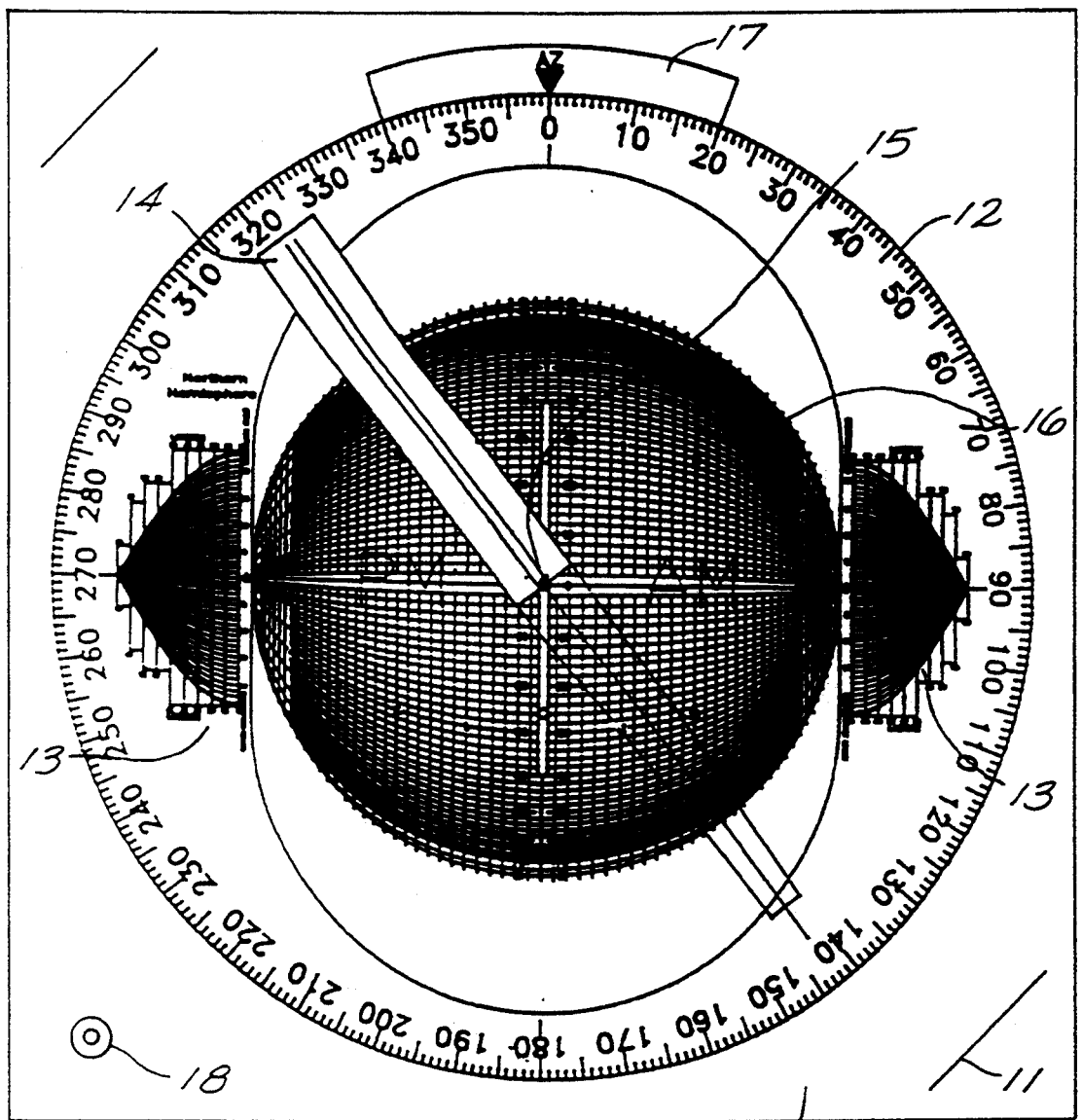
FIG. 1 is a plan view of the preferred embodiment of the invention.

FIG. 1 is a plan view of the preferred embodiment of the invention.

The compass consist of: a rotatable compass rose 12 in which is placed a sliding latitude clock 16 and affixed in the center is a pointer 14 which has a styler 15 extending perpendicular from the center of the compass rose 12.

In operation, the user first calculates the solar time which is the local time adjusted for the longitude of the user and the equation of time which can be found in the ephemeris, a common reference manual. After calculating the solar time, the declination of the sun, which varies based on the time of year, is found in the ephemeris. After determining the declination of the sun, the user finds the corresponding grid point on the declination-latitude scale 13 which represents the declination of the sun and the location in latitude of the user. This point is marked using a pen or pencil. The user then slides the latitude clock 16 up or down until the center of the latitude clock 16 is even with the pen mark on the declination-latitude scale 13. This adjusts the solar compass for the declination of the sun and the location of the user.

The user then locates the grid point on the latitude clock 16 which represents the solar time and the latitude of the user. This place is marked on the latitude clock 16 using a pen or pencil. The user rotates the pointer 14 until it points to that grid location. The pointer is now in the plane of the sun.

The user rotates the compass rose 12 until the shadow cast by the stylet 15 (extending perpendicular to the plane of this figure) falls between two lines inscribed on the pointer 14. The azimuth is read off the compass at the mark piece 17.

Alternatively, the compass rose can be rotated until the desired azimuth reading is lined up under the mark piece 17. The body of the compass 10 is then rotated until the shadow cast by the stylet 15 falls between two lines inscribed on the pointer 14. The azimuth can be sighted through the sights 11.

During the entire operation, the user insures the level of the compass by utilizing a bubble level 18.

Figure 2:
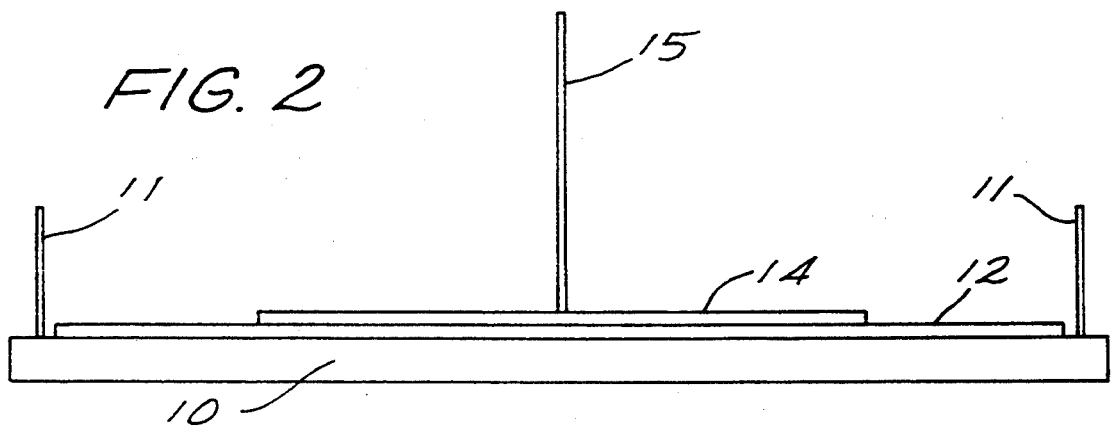
FIG. 2 is a side view of the preferred embodiment of the invention.

FIG. 2 is a side view of the invention showing the stylet 15 extending perpendicular to the plane of the compass rose 12. Note that the compass rose 12 and the latitude clock 16 are substantially in the same plane.

Figure 3:
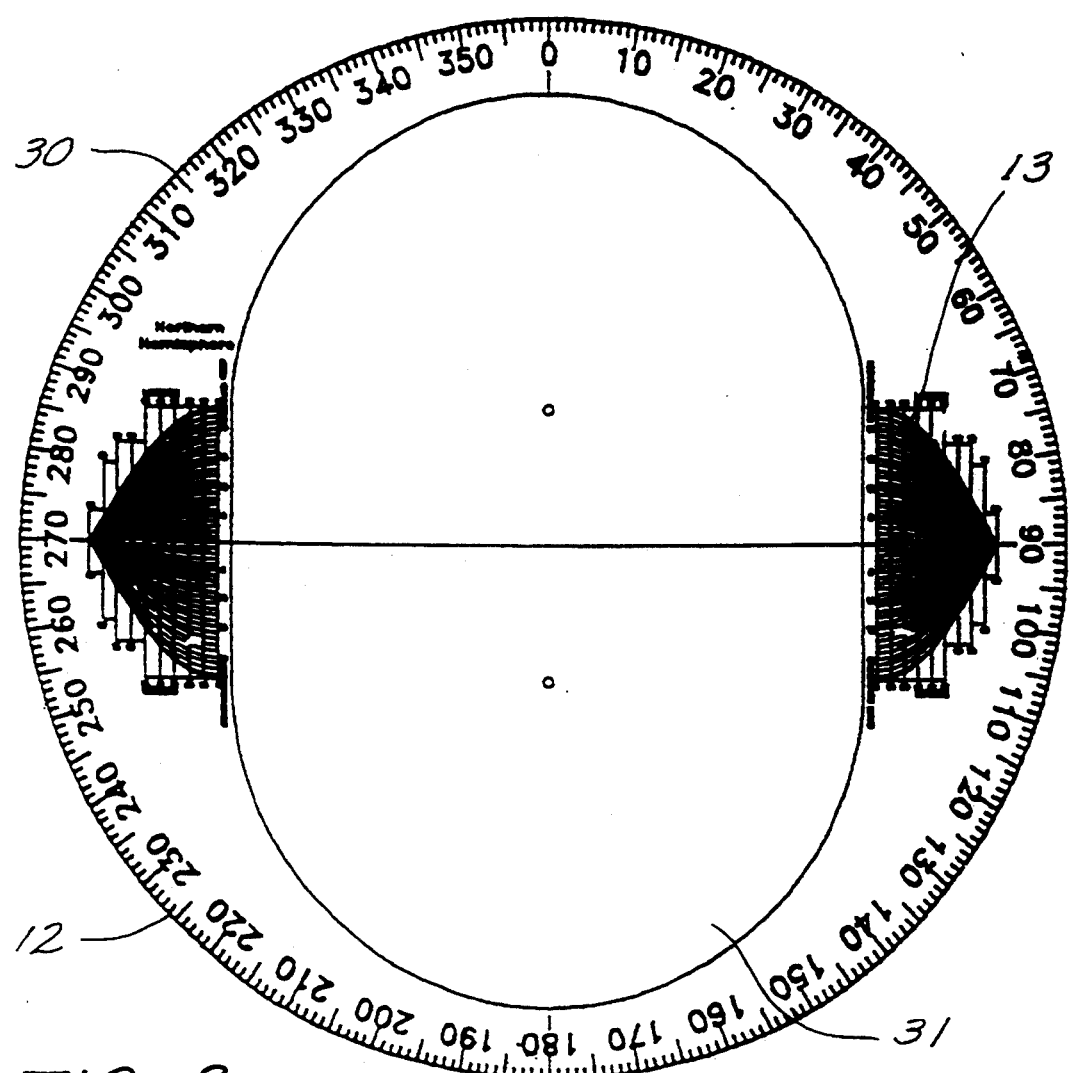
FIG. 3 is a detailed view of the compass rose.

FIG. 3 is a detailed drawing of the compass rose 12 showing the scale 30. Scale 30 is divided into 360 even divisions representing the 360 degrees of the compass. The compass rose 12 has an opening 31 in its middle in which is placed the latitude clock 16. The latitude clock 16 is free to slide up and down the middle opening 31 of the compass rose 12. Inscribed on the compass rose 12 is the declination-latitude scale 13 which permits the calibration of the latitude clock.

Figure 4A:
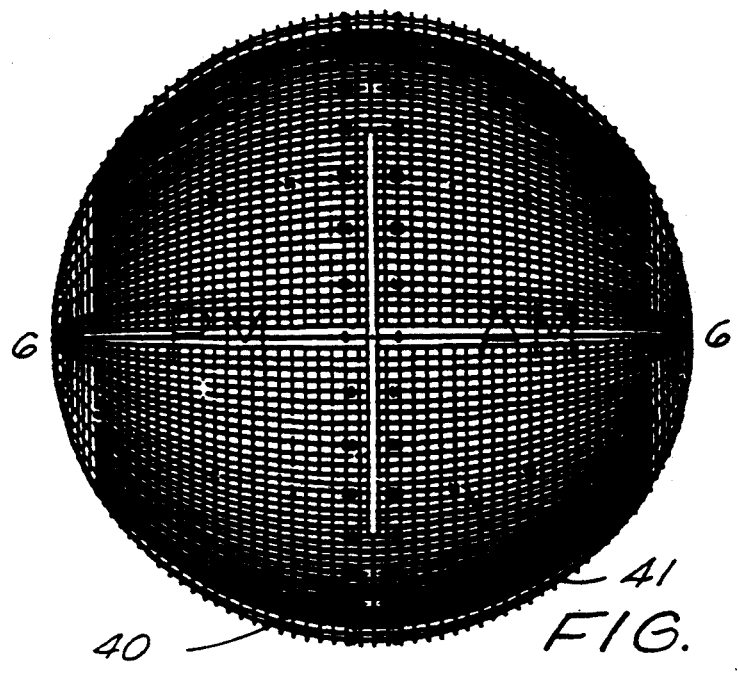
FIG. 4a is a detailed view of the latitude clock for use in the Northern hemisphere.
Figure 4B:
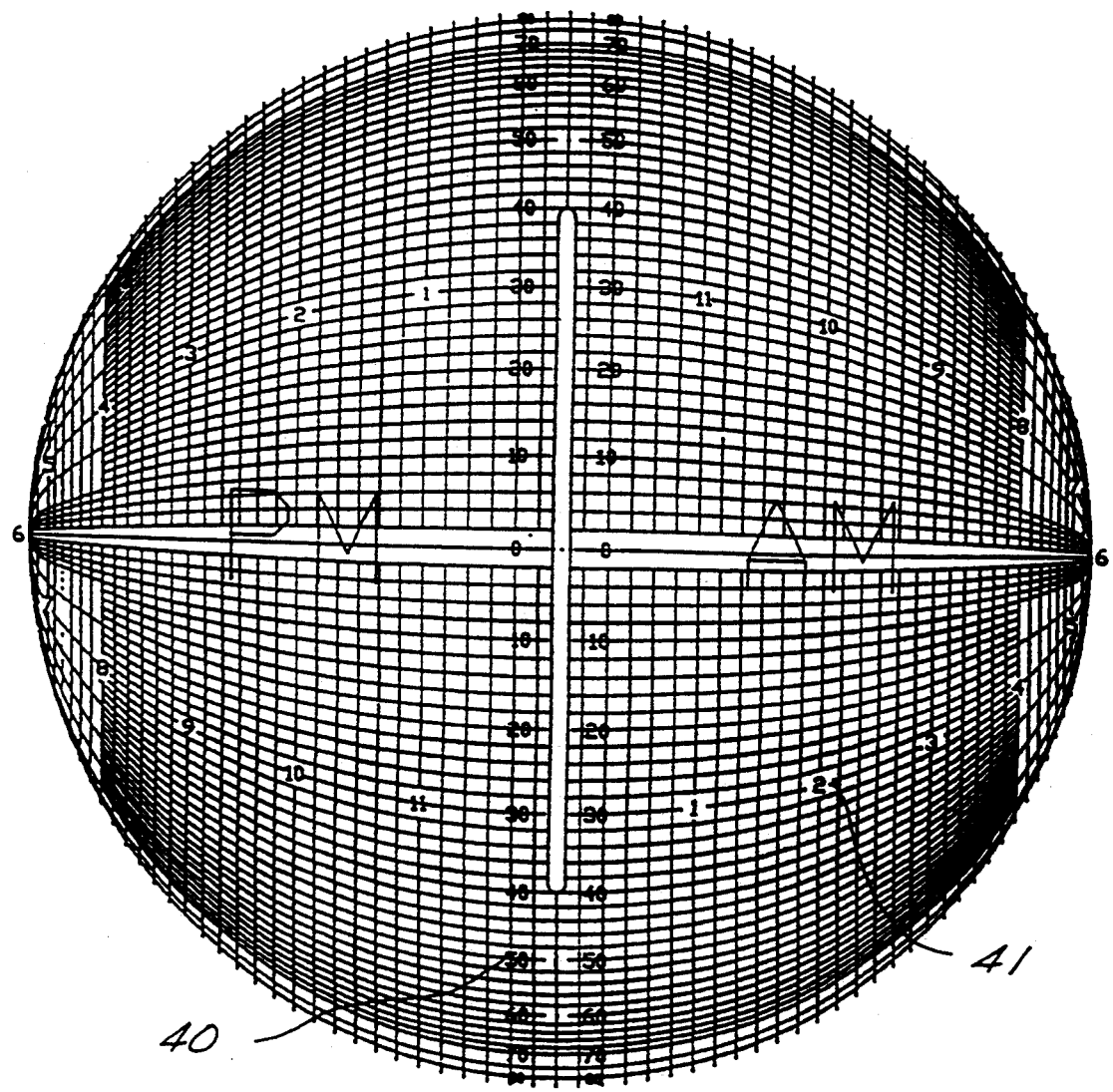
FIG. 4b is a detailed view of the latitude clock for use in the Southern hemisphere.

FIGS. 4a and 4b are a detailed view of the latitude clock 16. The latitude clock is reversible, one side is used in the Northern hemisphere (FIG. 4a) and one side is used in the Southern hemisphere (FIG. 4b). The clock is inscribed with vertical lines 41, each line representing a fixed time. The elliptical lines 40 represent the latitude. In the Northern hemisphere, the user begins at the latitude corresponding to his location and moves clockwise along this elliptical line 40 until it intersects the vertical line 41 representing the solar time. In the Southern hemisphere, the user begins at the latitude corresponding to his location and moves counterclockwise along this elliptical line 40 until it intersects the vertical line 41 representing the solar time. At this intersection, a reference mark is made and used to calibrate the pointer.

Figure 5:
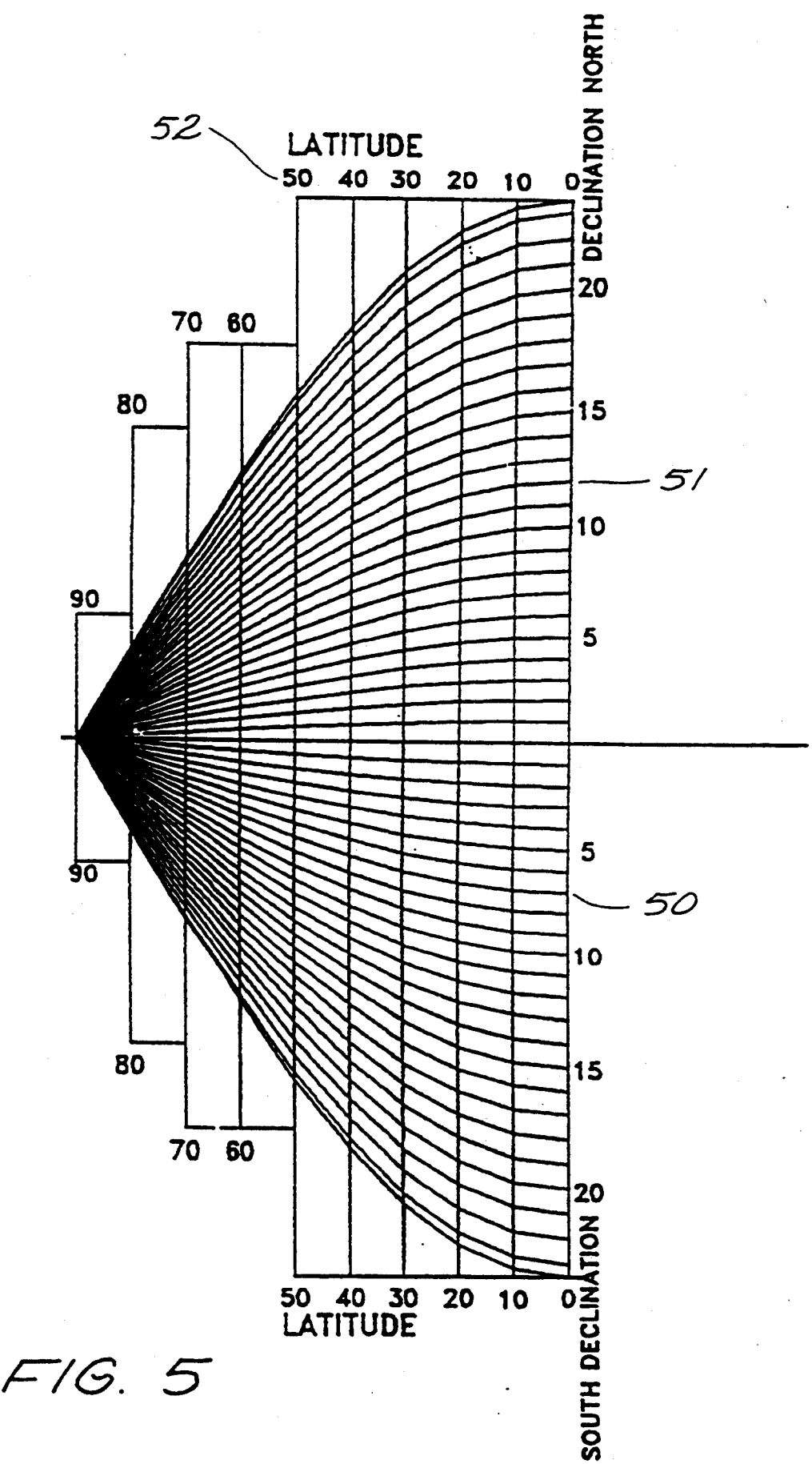
FIG. 5 is a detailed view of the declination-latitude scale.

FIG. 5 is a detailed view of the declination-latitude scale 13. The scale is divided into two halves, one half representing south declination 50, the other north declination 51. Vertical lines 52 represents latitude and the radial lines 53 represent degrees of declination. The user, after determining the declination of the sun from the ephemeris, finds the declination on the declination scale 53. The user then follows the declination scale 53 outboard until reaching the latitude reading on the latitude scale 52 corresponding to the user's location.

Figure 6:
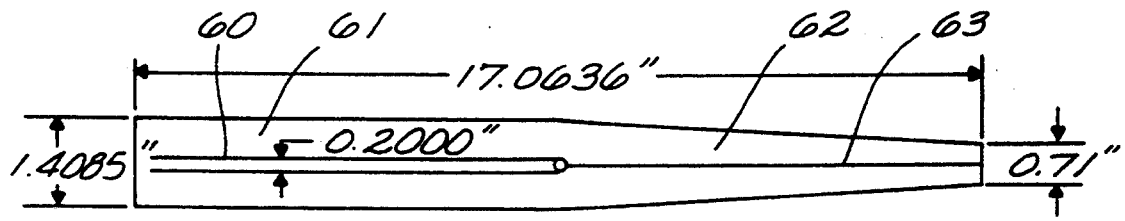
FIG. 6 is a detailed view of the pointer.

FIG. 6 is a detailed view of the pointer 14. The pointer is divided into two halves. One half 62 is transparent, the other is opaque 61. On the transparent end a single line 63 is inscribed and on the opaque side two lines 60 are spaced a fixed distance apart. The user rotates the pointer 14 until the single line 63 points to the corrected solar time on the latitude clock 16. The pointer 14 then lies in the plane of the sun. The user rotates the body 10 of the compass until the shadow cast by the stylet 15 falls between the two lines 60. The compass now points in the direction of true north. Alternatively, once the single line 63 points to the corrected solar time, the compass rose 12 is rotated until the shadow cast by the stylet 15 falls between the two lines 60. The azimuth is read off the compass at the mark piece 17.

FIG. 7 is a flow chart of the preferred embodiment's capability to find true north or an azimuth.

After start of the operation 70, the user finds the longitude for his location 71 and the equation of time 72 from the solar ephemeris. This information is used by the user to calculate the solar time 73. The user then finds the solar declination 74 from the ephemeris.

The user adjusts the latitude clock for the solar declination and latitude 75 and rotates the pointer until it points to the solar time 76. The pointer is now in the plane of the sun.

If the user is looking for true north, the compass body is rotated until the shadow cast by the stylet falls between two lines on the pointer 78a. The compass is now pointing in the direction of true north 79a.

If the user is looking for the azimuth, the compass rose is rotated until the shadow cast by the styler falls between the lines on the pointer 78b. The azimuth is then read off the mark piece 79b.

What is claimed is:

1. A solar compass comprising:
   a) a rotating planar member having azimuth markings inscribed around the perimeter thereof, said planar member having an opening in its center;
   b) a sliding latitude clock scale positioned in the opening of said rotating planar member and in the same plane as said rotating member, said sliding latitude clock having two sides, one side for use in the Northern hemisphere and one side for use in the Southern hemisphere;
   c) a pair of declination-latitude scales inscribed on said rotating planar member diametrically opposed to each other and positioned along an axis perpendicular to the axis of motion of said latitude clock, said declination-latitude scales for calibrating said latitude clock scale;
   d) a rotating pointer having an opaque portion and a transparent portion, said rotating pointer affixed in a center of said rotating planar member and having a single orientation line extending from a center locale of said rotating pointer to an opposing end of the transparent portion, and two spaced apart lines extending from substantially the center locale to an end of the opaque portion; and,
   e) a stylet means for casting a shadow on said rotating member, said stylet means affixed in the center of said rotating planar member and extending perpendicular to the plane of said rotating planar member.

2. The solar compass according to claim 1 further including a rigid substrate means for securing said rotating planar member.

3. The solar compass according to claim 2 further having a level indicator means for indicating a representation of level, said level indicator means attached to said rigid substrate.

4. The solar compass according to claim 2 further including a fixed azimuth mark means for laying off an azimuth, said azimuth means attached to said rigid substrate.

5. The solar compass according to claim 4 further including two fixed metal members means for sighting an azimuth line, said fixed metal members means attached to said rigid substrate along the same axis as the center of said fixed azimuth means.

6. A solar compass comprising:

a) a rotating planar member having azimuth markings inscribed around the perimeter thereof, said planar member having an opening therein;
b) a latitude clock positioned in the opening of said rotating planar member;
c) a pair of declination-latitude scale means for calibrating said latitude clock, said declination-latitude scale means inscribed on said rotating planar member;
d) a rotating linear pointer with two ends and affixed at a center locale of said rotating planar member and having an orientation line extending from the center point to each end;
e) a stylet means for casting a shadow onto said rotating linear member, said stylet means extending perpendicular to the plane of said rotating planar member at said center locale.

7. The solar compass according to claim 6 further including a rigid substrate means for securing said rotating planar member.

8. The solar compass according to claim 7 further including a level indicator means for indicating a representation of level, said level indicator means attached to said rigid substrate.

9. The solar compass according to claim 7 further including a fixed azimuth mark means for laying off an azimuth, said azimuth mark means being attached to said rigid substrate.

10. The solar compass according to claim 7 further including two member means for sighting an azimuth line, said two member means being attached to said rigid substrate.

11. A solar compass comprising of:
a) a rotatably displaceable disc having 360 equally spaced markings inscribed around the perimeter thereof in a clockwise pattern, said rotatably displaceable disc having an ellipsoidal opening in the center;
b) a sliding planar member, inscribed with a coordinate system of time and latitude, positioned in the ellipsoidal opening of said rotatably displaceable disc and in the same plane as said rotatably displaceable disc, said sliding plane member having two sides, one side for use in the Northern hemisphere and one side for use in the Southern hemisphere;
c) a pair of declination-latitude scale means for calibrating said sliding planar member and inscribed on said rotatably displaceable disc opposite each other and positioned along an axis perpendicular to the axis of motion of said sliding planar member;
d) an elongated pointer having one side opaque and one side clear, said pointer affixed in the center of said rotatably displaceable disc and free to rotate about its center, said pointer having a single orientation line extending from a center point thereof and radially outward to the end of the clear side and two lines spaced a fixed distance apart extending from the center point thereof and radially outward to the end of the opaque side; and,
e) a shadow generating member affixed in the center of said rotatably displaceable disc and extending perpendicular to the plane of said rotatably displaceable disc.

12. The solar compass according to claim 11 further including a rigid base means for securing said rotatably displaceable disc.

13. The solar compass according to claim 12 further including a level indicator means attached to said rigid base for indicating a representation of level.

14. The solar compass according to claim 12 further including a fixed azimuth piece means attached to said rigid base for laying off an azimuth.

15. The solar compass according to claim 14 further including two fixed sighting means for sighting an azimuth line and attached to said rigid base along the same axis as the center of said fixed azimuth piece means.

* * * * *